(12) United States Patent
Juels

(10) Patent No.: US 9,495,668 B1
(45) Date of Patent: Nov. 15, 2016

(54) COMPUTING SOLUTIONS TO A PROBLEM INVOLVING INVERSION OF A ONE-WAY FUNCTION

(71) Applicant: EMC Corporation, Hopkinton, MA (US)

(72) Inventor: Ari Juels, Brookline, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 546 days.

(21) Appl. No.: 14/039,215

(22) Filed: Sep. 27, 2013

Related U.S. Application Data (60) Provisional application No. 61/821,749, filed on May 10, 2013.

(51) Int. Cl.
*H04L 29/06* (2006.01)
*G06Q 20/06* (2012.01)

(52) U.S. Cl.
CPC .............. *G06Q 20/06* (2013.01); *H04L 63/10* (2013.01); *H04L 63/1458* (2013.01)

(58) Field of Classification Search
CPC . H04L 63/10; H04L 63/1458; G06Q 20/065; G06Q 20/0652; G06Q 20/0658
See application file for complete search history.

(56) References Cited

U.S. PATENT DOCUMENTS

| 6,157,920 | A | 12/2000 | Jakobsson et al. |
| 7,197,639 | B1 | 3/2007 | Juels et al. |
| 7,356,696 | B1 | 4/2008 | Jakobsson et al. |
| 7,600,255 | B1 * | 10/2009 | Baugher ............. H04L 63/1458 370/242 |
| 2007/0011453 | A1 * | 1/2007 | Tarkkala et al. ...... H04L 9/3013 713/168 |
| 2011/0231913 | A1 * | 9/2011 | Feng ....................... G06F 21/46 726/7 |

OTHER PUBLICATIONS

Heusser, "Sat solving—An alternative to brute force bitcoin mining", Feb. 2013, 12 pages.*
Tsang et al., "Combating Spam and Denial-of-Service Attacks with Trusted Puzzle Solvers", 2008, pp. 188-202.*
M. Abadi et al., "Moderately Hard, Memory-Bound Functions," ACM Transactions on Internet Technology (TOIT), May 2005, pp. 299-327, vol. 5, No. 2.
Adam Back, "Hashcash—A Denial of Service Counter-Measure," USENIX Technical Conference, (USENIX), http://www.hashcash.org/papers/hashcash.pdf, Aug. 2002, 10 pages.
D. Boneh et al., "Identity-Based Encryption from the Weil Pairing," Proceedings of the 21st Annual Cryptology Conference on Advances in Cryptology (CRYPTO), Lecture Notes in Computer Science (LNCS), Aug. 2001, pp. 213-229, vol. 2139.

(Continued)

*Primary Examiner* — David Pearson
*Assistant Examiner* — Thaddeus Plecha
(74) *Attorney, Agent, or Firm* — Ryan, Mason & Lewis, LLP (57) ABSTRACT

A method comprises sending a set of values from a first party to a second party, the set of values being usable to compute a solution to a first problem involving inversion of a first one-way function. The method further comprises receiving a given value from the second party and utilizing the given value as an input for computing a solution to a second problem involving inversion of a second one-way function, wherein a valid solution to the second problem uses as input a valid solution to the first problem.

20 Claims, 4 Drawing Sheets

(56) References Cited

OTHER PUBLICATIONS

D. Chaum et al., "Wallet Databases with Observers (Extended Abstract)," Proceedings of the 12th Annual International Cryptology Conference on Advances in Cryptology (CRYPTO), Lecture Notes in Computer Science (LNCS), Aug. 1992, pp. 89-105, vol. 740.
C. Dwork et al., "On Memory-Bound Functions for Fighting Spam," Proceedings of the 23rd Annual International Cryptology Conference on Advances in Cryptology (CRYPTO), Lecture Notes in Computer Science (LNCS), Aug. 2003, pp. 426-444, vol. 2729.
C, Dwork et al., "Pricing via Processing or Combatting Junk Mail," Proceedings of the 12th Annual International Cryptology Conference on Advances in Cryptology (CRYPTO), Lecture Notes in Computer Science (LNCS), Aug. 1992, pp. 139-147, vol. 740.
M. Jakobsson et al., "Proofs of Work and Bread Pudding Protocols (Extended Abstract)," Proceedings of the IFIP TC6/TC11 Joint Working Conference on Secure Information Networks: Communications and Multimedia Security, 1999, pp. 258-272.
A. Juels et al., "Client Puzzles: A Cryptographic Countermeasure Against Connection Depletion Attacks," Proceedings of Networks and Distributed Security Systems (NDSS), Jan. 1999, pp. 151-165.
S. Micali et al., "Micropayments Revisited," Proceedings of the Cryptographer's Track at the RSA Conference on Topics in Cryptology, 2002, pp. 149-163.
Satoshi Nakamoto, "Bitcoin: A Peer-to-Peer Electronic Cash System," http://bitcoin.org/bitcoin.pdf, 2008, 9 pages.
R.L. Rivest et al., "PayWord and MicroMint: Two Simple Micropayment Schemes," International Workshop on Security Protocols, Lecture Notes in Computer Science (LNCS), Jan. 1997, pp. 69-87, vol. 1189.
J. Rangasamy et al., "An Integrated Approach to Cryptographic Mitigation of Denial-of-Service Attacks," Proceedings of the 6th ACM Symposium on Information, Computer and Communications Security (ASIACCS), Mar. 2011, pp. 114-123, Hong Kong, China.
T. Aura et al., "DOS-Resistant Authentication with Client Puzzles," Revised Papers from the Proceedings of the 8th International Workshop on Security Protocols, Lecture Notes in Computer Science (LNCS), Apr. 2000, pp. 170-177, vol. 2133, Cambridge, United Kingdom.
S. Doshi et al., "Efficient Memory Bound Puzzles Using Pattern Databases," Proceedings of the 4th International Conference on Applied Cryptography and Network Security (ACNS), Jun. 2006, pp. 98-113.
F. Lilkaer et al., "RB-PoW: A Reputation Based Approach to Cryptographic Mitigation of Denial-of-Service Attacks," KTH Computer Science and Communications, Bachelor of Science Thesis, Apr. 2013, 28 pages.
J. Becker et al., "Can We Afford Integrity by Proof-of-Work? Scenarios Inspired by the Bitcoin Currency," Proceedings of the 11th Annual Workshop on the Economics of Information Security (WEIS), Jun. 2012, 17 pages, Berlin, Germany.

* cited by examiner

COMPUTING SOLUTIONS TO A PROBLEM INVOLVING INVERSION OF A ONE-WAY FUNCTION

CROSS-REFERENCE TO RELATED APPLICATIONS

The present application claims the benefit of U.S. Provisional Application No. 61/821,749, filed May 10, 2013, the disclosure of which is incorporated by reference herein.

FIELD

The present invention relates generally to computation, and more particularly to distributing computations among processing devices.

BACKGROUND

Digital currency systems such as the Bitcoin digital currency system involve a process of "mining" or coin production that consumes vast computational resources. Bitcoin is a monetary system based on the equivalence "time=money." Time in this sense refers to computation time, while money in this sense refers to units of payment also referred to as Bitcoins. Bitcoins are generated and used in a peer-to-peer computing network. To generate a batch of coins in the Bitcoin system, clients perform an operation called mining. Mining coins requires solving a computationally intensive problem which involves repeated cryptographic hashing. Thus, a coin represents an investment of computational resources.

SUMMARY

In one embodiment, a method comprises sending a set of values from a first party to a second party, the set of values being usable to compute a solution to a first problem involving inversion of a first one-way function. The method further comprises receiving a' given value from the second party and utilizing the given value as an input for computing a solution to a second problem involving inversion of a second one-way function, wherein a valid solution to the second problem uses as input a valid solution to the first problem.

In another embodiment, an apparatus comprises a processing device at a first party. The processing device comprises a memory and a processor coupled to the memory. The processing device is configured to implement a puzzlet generation module configured to send a set of values to the second party, the set of values being usable to compute a solution to a first problem involving inversion of a first one-way function, The processing device is further configured to implement a puzzlet verification module configured to receive a given value from the second party and to utilize the given value as an input for computing a solution to a second problem involving inversion of a second one-way function, wherein a valid solution to the second problem uses as input a valid solution to the first problem.

These and other features and advantages of embodiments of the present invention will become more readily apparent from the accompanying drawings and the following detailed description.

DETAILED DESCRIPTION

Embodiments of the invention will be described herein with reference to an exemplary communication system in which multiple processing devices communicate with one another to compute a solution to a problem involving inversion of a one-way function. It is to be appreciated, however, that the invention is not restricted to use in this or any other particular communication system configuration.

As described above, digital currency systems such as Bitcoin can consume vast computational resources for mining operations. In the Bitcoin system, for example, mining a Bitcoin requires a significant number of hash computations. As of mid-2013, mining a Bitcoin requires about $2^{55}$ hash computations, which is almost exactly the average effort required to crack a data encryption standard (DES) key having an effective length of 56 bits. By virtue of the Bitcoin system, the number of hash computations required for mining coins increases as more coins are mined.

The Bitcoin system involves not just mining, but also a system of authenticating and publishing transactions. In addition to coins each mining operation ratifies a block, which is a data structure over recent transactions. In Bitcoin, mining involves finding a valid solution n to the following problem:

$$\text{SHA-256}\{v\|B_l\|MR(TR_1, \ldots, TR_m)\|T\|n\} \leq \text{target} \quad (1)$$

where v is a software version number, $B_l$ denotes the last generated block, $TR_1, \ldots, TR_m$ is a set of transactions that have been announced but not yet confirmed by peers in the network since the generation of $B_l$, MR(x) denotes the root of the Merkle tree over transactions x, T is the current time in seconds since 1970-01-01T00:00 UTC, n is a nonce, and target is a 256-bit value that determines the difficulty of the mining operation.

The target value is updated according to the generation times of the last 2016 blocks, and specifies a number of leading zeros required for a valid nonce. The nonce n is nominally 32 bits in length, but an "extraNonce" field effectively extends it to up to 104 bytes or 832 bits. N denotes the space of possible nonces. By convention, the first transaction in x awards coins to the miner of the block. The miner is identified by a public key PK used for payment transactions. The particular details of the Bitcoin mining problem may be abstracted away by defining $$X = v\|B_l\|MR(TR_1, \ldots, TR_m)\|T \quad (2)$$

where X is the collection of inputs specific to a block. The hashing operation SHA-256 is referred to as H and for brevity target=Z. A Bitcoin mining operation thus involves, for block value X, the discovery of an input ("nonce") n∈N for which $H(X,n) \leq Z$. In Bitcoin, Z specifies that a valid output have k leading "0" bits. This hash-inversion problem is referred to herein as the "Bitcoin puzzle."

The Bitcoin puzzle was designed to achieve several properties essential to the Bitcoin system. First, the Bitcoin system adjusts the effort associated with the mining operation once every 2016 blocks (mining operations) to ensure the production of a block (and thus batch of coins) roughly once every ten minutes. Given this ongoing calibration, the resources required to perform a mining operation should have a simple and precise statistical characterization. To find an n that satisfies the condition $H(X,n) \leq Z$ in Bitcoin simply requires R/Z computations on average, where R is the size of the hash function range ($2^{256}$ for SHA-256). In other words, Bitcoin was designed such that a mining operation has predictable effort.

Second, the Bitcoin puzzle is designed for fast verification. While solving a Bitcoin puzzle may be computationally expensive, verification of solutions is computationally inexpensive to permit rapid verification of transactions and coin validity by any user. Verifying the correctness of a proffered nonce n, i.e., that $H(X,n) \leq Z$, requires only one hash computation.

Third, the Bitcoin puzzle should be resistant to any pre-computation efforts. In other words, any computation by a client prior to learning X should not be useful in solving the Bitcoin puzzle. Without knowledge of X, it is infeasible to perform useful pre-computation for the Bitcoin puzzle. To be more precise, useful pre-computation is infeasible assuming that the set of transactions in the system is of sufficiently high entropy to render X unguessable.

The computationally intensive nature of mining in the Bitcoin system means that peers constituting the Bitcoin network have consumed and will continue to consume massive computing resources and natural resources such as electricity. The Bitcoin system was designed to have specific features which are incompatible with leveraging the computation used for Bitcoin mining for other purposes.

Embodiments of the invention provide techniques for repurposing or reusing computation invested in solving a given problem involving inversion of a one-way function for a purpose which is unrelated to solving the given problem. As one example, embodiments may be used in a modified Bitcoin architecture such that the computations performed for Bitcoin mining can simultaneously serve other unrelated and useful goals. Examples of such goals include but are not limited to spam prevention and denial of service (DoS) mitigation.

While embodiments of the invention are described herein primarily with respect to a modified Bitcoin system, the invention is not limited solely for use in mining digital currency in the Bitcoin system. Instead, embodiments are more generally applicable to other application areas and use cases.

As one example, embodiments of the invention may be utilized in the MicroMint digital cash system, which is described in an article by Ronald L. Rivest et al. entitled "PayWord and MicroMint-two simple micropayment schemes," *International Workshop on Security Protocols*, pages 69-87, 1997, which is incorporated by reference herein. MicroMint is a digital cash system in which coins consist of hash collisions. MicroMint aims to mimic the economics of a real, physical mint Real-world mining carries a high base cost, involving the design of coinage, the purchase of minting machinery, etc. The incremental cost of producing coins, though, is minimal. MicroMint is designed to require computation of many hash images to find the first coinworthy collision. Subsequent collisions accumulate quickly thereafter as additional hash images are computed. This global problem or puzzle may be modified such that hash image calculations form puzzlets which are distributed to workers for computation.

Figure 1:
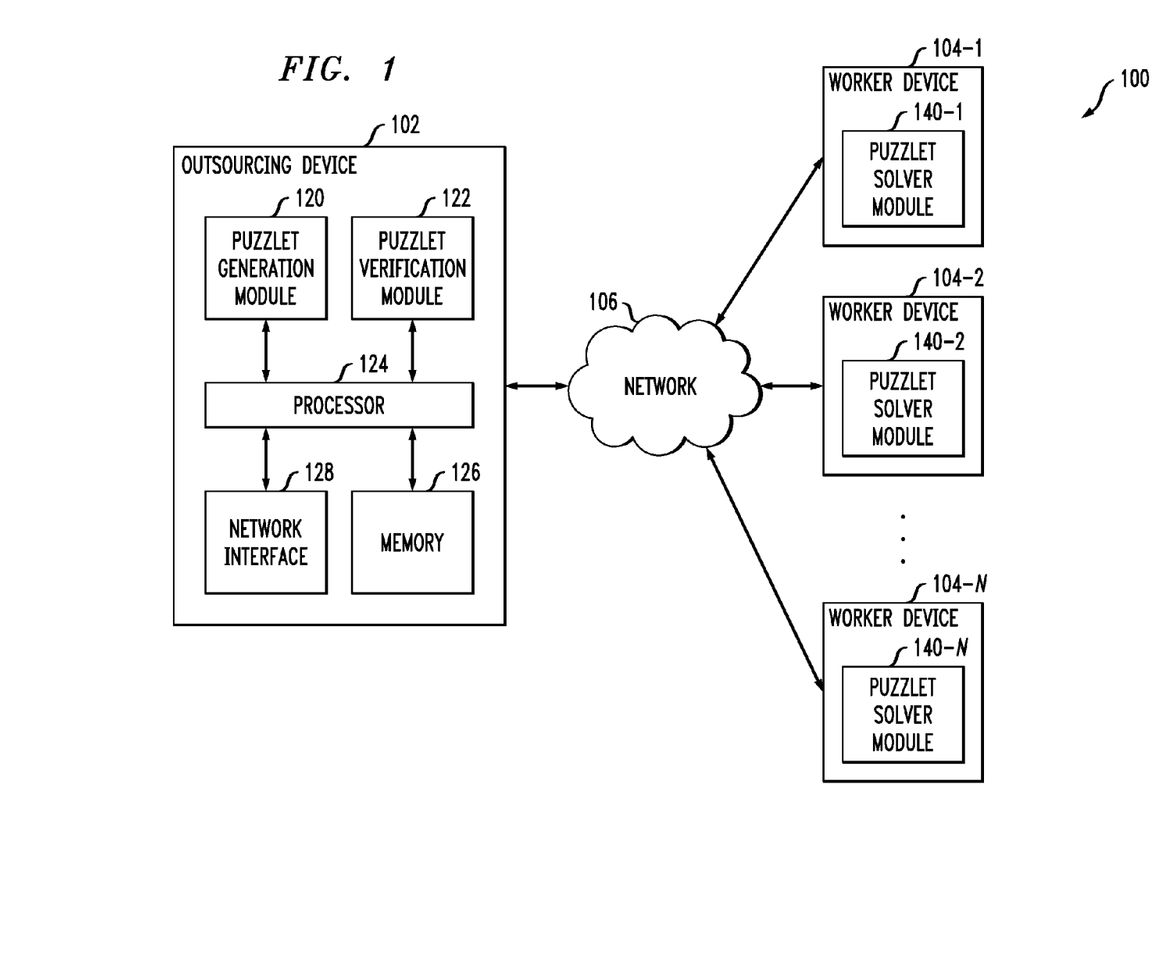
FIG. 1 is block diagram of a communication system in which embodiments of the present invention may be implemented.

FIG. 1 illustrates a communication system 100. The communication system 100 includes an outsourcing device 102 and worker devices 104 connected via network 106. The outsourcing device 102 and worker devices 104 are examples of processing devices. As will be described in further detail below, the outsourcing device 102 attempts to solve a global puzzle or problem by distributing puzzlets to worker devices 104. The worker devices 104 compute solutions to the puzzlets and send the solutions to the outsourcing device 102. The outsourcing device 102 uses solutions to the puzzlets to determine a solution to the global puzzle or problem.

Outsourcing device 102 comprises a puzzlet generation module 120 and puzzlet verification module 122 while each of the worker devices 104 comprises a respective puzzlet solver module 140. Puzzlet generation module 120, puzzlet verification module 122 and puzzlet solver module 140 comprise functional modules which may be implemented via hardware, software or a combination of hardware and software to provide functionality to be described below.

The outsourcing device 102 also comprises a processor 124, memory 126 and network interface 128. The processor 124 may comprise a microprocessor, a microcontroller, an application-specific integrated circuit (ASIC), a field-programmable gate array (FPGA) or other type of processing circuitry, as well as portions or combinations of such circuitry elements.

The memory 126 may comprise random access memory (RAM), read-only memory (ROM) or other types of memory, in any combination. The memory 126 and other memories disclosed herein may be viewed as examples of what are more generally referred to as processor-readable storage media storing executable program code.

The network interface 128 allows the outsourcing device 102 to communicate over the network 106 with the worker devices 104. The network interface 128 may comprise one or more conventional transceivers.

The network 106 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks.

Although not explicitly shown in FIG. 1, the worker devices 104 may also comprise respective processors, memories and network interfaces similar to the processor 124, memory 126 and network interface 128 of outsourcing device 102, respectively.

It is to be appreciated that the particular set of elements shown in FIG. 1 in system 100 is presented by way of example, and in other embodiments additional or alternative elements may be used. Thus, another embodiment may include additional networks, devices, servers, etc. For example, a system may include multiple outsourcing devices each of which communicates with a number of worker devices.

In some embodiments, a given device may act as both an outsourcing device and a worker device. For example, a given worker device may include a puzzlet generation module and puzzlet verification module similar to the outsourcing device 102. The given worker device may act as a worker in relation to the outsourcing device 102 and as an outsourcer in relation to one or more other worker devices. Thus, while the system 100 in FIG. 1 shows devices each of which is either an outsourcer or a worker, embodiments are not limited solely to this arrangement. Instead, one or more processing devices may include the puzzlet generation, puzzlet verification and puzzlet solver functional modules to act as both an outsourcer and a worker.

The system 100 may include additional or alternative processing platforms, as well as numerous distinct processing platforms in any combination, with each such platform comprising one or more computers, servers, storage devices or other types of processing devices. For example, the outsourcing device 102, one or more of the worker devices 104, or a combination of the outsourcing device 102 and one or more worker devices 104 may be implemented via one or more processing platforms.

Such processing platforms may include cloud infrastructure comprising virtual machines (VMs) and one or more associated hypervisors. An example of a commercially available hypervisor platform that may be used to implement portions of the communication system 100 is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of the system 100.

Figure 2:
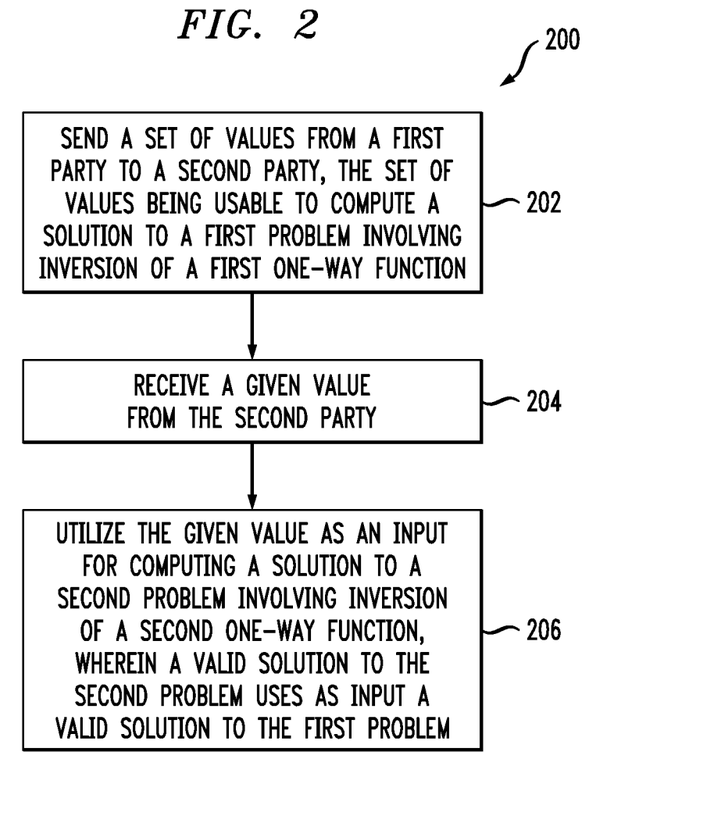
FIG. 2 illustrates a methodology for computing solutions to a problem involving inversion of a one-way function, according to an embodiment of the invention.

FIG. 2 illustrates a methodology 200 for computing solutions to a problem involving inversion of a one-way function. The methodology 200 begins with step 202, where a set of values is sent from a first party to a second party. The outsourcing device 102 in system 100 is an example of the first party and the worker device 104-1 is an example of the second party. The set of values is usable to compute a solution to a first problem involving inversion of a first one-way function. The first problem is an example of the puzzlet described above.

Methodology 200 continues with step 204, receiving a given value from the second party. The given value is a solution to the first problem computed by the second party. In some embodiments, the first party will verify that the given value is a valid solution to the first problem. In other embodiments, the second party may be a trusted party such that the first party does not verify the given value. The first party then utilizes 206 the given value as an input for computing a solution to a second problem involving inversion of a second one-way function. A valid solution to the second problem uses as input a valid solution to the first problem. A valid solution to the second problem can also be used for solving the global puzzle or problem described above.

The methodology 200 may be utilized in a modified Bitcoin system. The modified Bitcoin system repurposes the computation invested in mining Bitcoins for simultaneous reuse in other applications. The problem to be solved in the mining operation in the modified Bitcoin system is an example of the global problem or puzzle described above. This puzzle is decomposed into a collection of small constituent puzzles or puzzlets. While a puzzle requires massive resources to solve, a puzzlet may be solved by a single client or device with only moderate effort. Puzzlets may be outsourced as a standalone computational task. In other words, a Bitcoin miner asks another entity to solve the puzzlet on its behalf. In the system 100, the outsourcing device 102 is an example of a Bitcoin miner and the worker devices 104 are examples of clients asked to solve the puzzle on the Bitcoin miner's behalf.

To deter spammers, for example, a receiver (e.g., outsourcing device 102) may accept incoming e-mail or other communications from a sender (e.g., one of the worker devices 104) only if the sender has attached a correct puzzlet solution. A single sender needs to solve only a single puzzlet, but a spammer must solve huge numbers of them. Thus, spamming is made computationally expensive. In addition, correctly solved puzzlets help the receiver to mine Bitcoins in the modified Bitcoin system.

As discussed above, embodiments may be used in a digital currency system. As an example, in a modified version of the Bitcoin system, the hashing operation used for mining Bitcoins is modified to a two-stage hashing operation. The two-stage hashing operation comprises two sequential hash problems: a $k_{in}$-bit hard inner hash problem and a $k_{out}$-bit hard outer hash problem. To mine a block a miner gathers solutions to the inner hash problem until one is found that satisfies the outer hash problem. The global problem or puzzle thus has k-bit hardness where $k=k_{in}+k_{out}$. Finding a single solution to the inner hash problem is comparatively easy. In some embodiments $k_{in} \leq k/2$. For example, k may be 56 where $k_{in}$ is only 28. The inner hash problems are distributed as puzzlets to workers.

To implement two-stage hashing, the hash function H of the Bitcoin system is partitioned into a pair $H_{in}$ and $H_{out}$ of sequentially composed hash functions referred to herein as the inner and outer hash problems, respectively. The inner hash problem $H_{in}$ is an example of the first problem referred to in methodology 200 while the outer hash problem is an example of the second problem referred to in methodology 200. While described below primarily with respect to hash-inversion problems, the global puzzle or problem in embodiments of the invention is more broadly applicable to other types of problems involving inversion of one-way functions other than hash functions.

The global puzzle in the modified Bitcoin system is of the following form:

$$H(X,n;s)=H_{out}(X,H_{in}(X,n;s)) \quad (3)$$

where s is an extra input used for the purposes of puzzlet recycling. The input s may be a supplementary value specific to a particular instance of the inner hash problem, and will be discussed in further detail below.

The inner hash $H_{in}$ is the puzzlet. A valid solution to a puzzlet is a pair (n, s) that satisfies $$I=H_{in}(X,n;s) \leq Z_{in} \quad (4)$$

where $Z_{in}$ is a target value representing the difficulty of solving the puzzlet.

A solution (n, s) to a puzzlet is also a solution to the global puzzle if it satisfies $$H_{out}(X,I) \leq Z_{out} \quad (5)$$

where $Z_{out}$ is a target value representing the difficulty of solving the global problem.

In the modified Bitcoin system, an outsourcer provides a puzzlet to a worker with a specified value of s. In some embodiments, an outsourced puzzlet P takes the form $$P=(X,Z_{in},s). \quad (6)$$

The task of the worker is to find an n such that (n,s) satisfies equation 4. The expected computation of the worker is $R/Z_{in}$ executions of $H_{in}$. The outsourcer can, however, verify the correctness of a solution n to P with just one application of $H_{in}$.

Each solution to P represents one potentially valid preimage for $H_{out}$ for the outsourcer to try. On average, the outsourcer must collect $R/Z_{out}$ puzzlet solutions to find a solution to the global puzzle.

Figure 3:
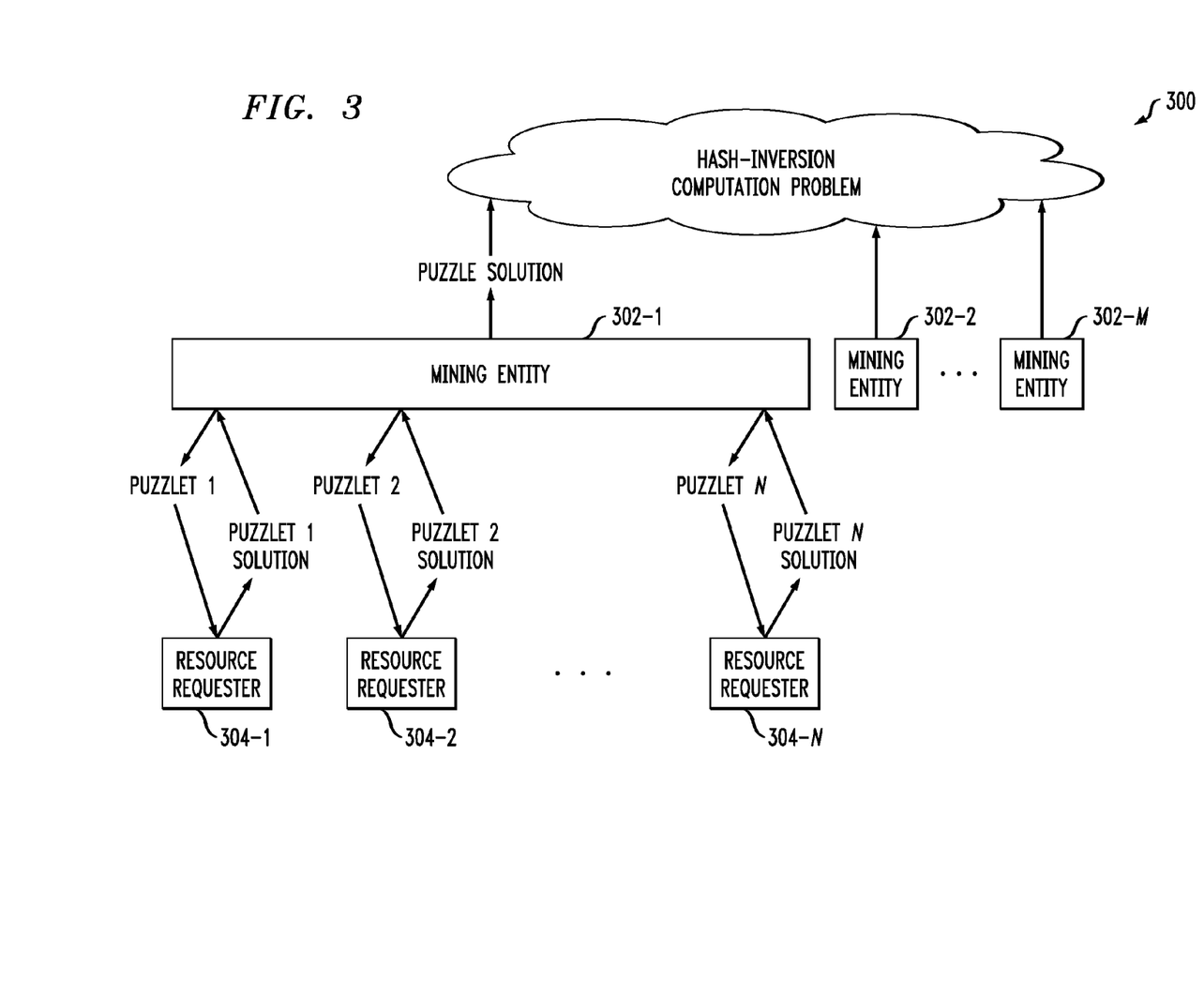
FIG. 3 illustrates a system for mining digital currency, according to an embodiment of the invention.

FIG. 3 illustrates an example of a system 300 for mining digital currency. The system 300 may be, by way of example, the modified Bitcoin system described above. The system 300 is based on a hash-inversion computation problem which multiple mining entities 302 attempt to solve. The hash-inversion computation problem is an example of a problem involving inversion of a one-way function. Mining entity 302-1 outsources puzzlets to various resource requestors 304. The mining entity 302-1 is an example of the outsourcer described above, while the resource requestors are examples of the workers described above. It is to be appreciated that the mining entity 302-1 need not be implemented via a single processing device. Instead, the mining entity 302-1 may be implemented via a processing platform in the manner described above. In addition, the mining entity 302-1 and resource requestors 304 may be considered a group of processing devices which work together to mine digital currency.

The mining entity 302-1 distributes different puzzlets to each of the resource requestors 304. For example, mining entity 302-1 distributes puzzlet 1 to resource requestor 304-1 and distributes puzzlet 2 to resource requestor 304-2. Each of the resource requestors 304 solves its respective puzzlet and provides a respective puzzlet solution to the mining entity 302-1. The mining entity 302-1 collects the puzzlet solutions from the resource requestors 304 and checks to see if any of the puzzlet solutions is also a valid solution to the global problem or puzzle, which may be used as the puzzle solution for the hash-inversion computation problem for the system 300.

It is important to note that while FIG. 3 shows resource requestors 304 interacting solely with mining entity 302-1 for clarity, embodiments are not limited solely to this arrangement. Instead, one or more other mining entities such as mining entity 302-2 may similarly distribute puzzlets to one or more of the worker devices 304. In some embodiments, each mining entity in the system has its own respective set of workers or resource requestors. In other embodiments, workers or resource requestors may be shared amongst a group of mining entities.

In the Bitcoin system, the global problem or puzzle is only valid during mining of a current block. As Bitcoin is parameterized such that a block is mined in ten minutes on average, an outsourced puzzle P is useful for a brief time in the modified Bitcoin system. Thus, an outsourcer should outsource and retrieve solutions to P quickly to benefit from worker effort.

Given the large number of puzzle solutions required to solve a global problem in the modified Bitcoin system, a pool of processing devices may share resources to mine a given Bitcoin block. Thus, as discussed above an outsourcer such as mining entity 302-1 may comprise a pool of processing devices working jointly to mine blocks. In some instances, the pool of processing devices in a mining entity may include outsourcers and workers. In other instances, the pool of processing devices in a mining entity may include outsourcers which distribute puzzlets to workers which are not part of the pool of processing devices.

Figure 4:
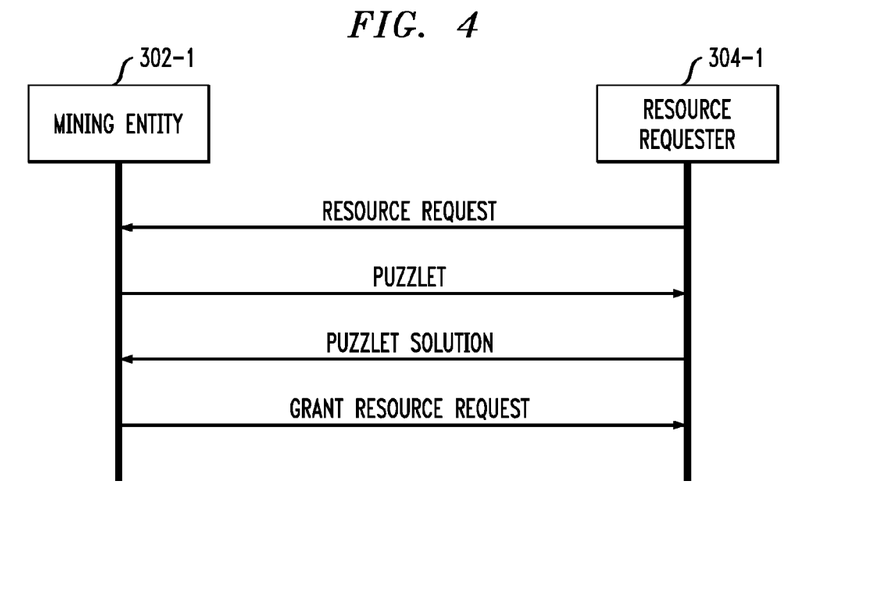
FIG. 4 illustrates communications between a mining entity and resource requestor in the system of FIG. 3, according to an embodiment of the invention.

In the system 300, the workers are the resource requestors 304. FIG. 4 illustrates communications between the mining entity 302-1 and a given one of the resource requestors 304-1. As shown in FIG. 4, the resource requestor 304-1 requests a resource from the mining entity 302-1. In response to the request, the mining entity 302-1 sends a puzzlet to the resource requestor 304-1. The resource requestor 304-1 provides a solution to the puzzlet and in response the mining entity 302-1 will grant the resource request. The request in FIG. 4 may be for various types of resources, examples of which will be described in further detail below.

In some embodiments, the resource requestor 304-1 may be a sender of a given e-mail. Thus, the resource requestor 304-1 requests that the mining entity 302-1 accept a given e-mail. To deter spammers, mining entity 302-1 may accept e-mail only if it includes a valid puzzlet solution. Puzzlets may be receiver-specific, such that a would-be spammer incurs the cost of solving puzzles for a large number of receivers making spamming computationally costly.

It may be impractical or undesirable for a receiver of e-mail to transmit a newly generated, block-specific value s to a sender before the sender transmits e-mail. As a result, in some embodiments the value s may be computed as a digest or hash of at least a portion of the e-mail. For example, the value s may be a hash of at least a portion of an e-mail preamble (e.g., one or more of the sender, receiver, timestamp, subject). The value s may alternatively be a hash of at least a portion of the body of the e-mail message, or portions of the e-mail preamble and the body of the e-mail message.

In some embodiments, the e-mail receiver such as mining entity 302-1 may have different rules or policies for different types of senders. For example, a receiver may define a set of trusted senders for which the receiver will accept e-mails without a valid puzzlet solution. The set of trusted senders may be those senders having an entry in an address book or contact list for a given receiver. The trusted senders may alternately be defined by a particular domain. As an example, a receiver may accept all e-mails coming from senders within a given company, such as all senders with a "*@givencompany.com" address. As another example, a student or professor at a particular college or university may accept e-mails from senders having a "*.edu" address.

In other embodiments, a resource request from the resource requestor 304-1 may be for a connection to the mining entity 302-1 or some other server. The connection may be a transmission control protocol (TCP) connection to the mining entity 302-1 or another server, a transport layer security (TLS) connection to the mining entity 302-1 or another server, etc. The mining entity 302-1 may require the resource requestor 304-1 to solve a puzzlet before accepting or authorizing a connection request to help deter DoS attacks, as a would-be attacker is required to solve many puzzlets which is computationally expensive.

In this example, the mining entity 302-1 may outsource puzzlets by presenting a fresh puzzlet P to a connecting client which requires presentation of a valid solution to the puzzlet within a short interval of time. The short interval of time may be based on the average time required to mine a Bitcoin block. A solution to P returned by the resource requestor 304-1 will then be applicable to a current Bitcoin block with high probability. The puzzlet-specific value s may be a random value provided by the mining entity to bind a puzzlet to a given request and ensure that submitted solutions are fresh. In some embodiments, the random value s may be generated using a pseudorandom number generator which uses a seed value based at least in part on one of or a combination of values relating to the resource request. Such values include, by way of example, a current time, an identity of the requestor, an identity of the server to which the requestor seeks to connect, etc.

In still other embodiments, the resource request may be a request for payment. In the modified Bitcoin system, each puzzlet solution has a quantifiable expected value to an outsourcer. In other words, a puzzlet solution has a given value which is based on the difficulty of the mining operation. If V is the value of Bitcoins generated by a successful block mining operation, the expected value of a puzzlet solution is VIZ. Thus, the resource request may be considered a request for payment or other compensation for assisting the outsourcing device in solving the global puzzle. The compensation need not be equal to the exact value of the puzzlet solution. In addition, the compensation may only be distributed by an outsourcer if the mining operation is successful (e.g., if the outsourcer successfully mines the current block).

It is important to note that resource requests are not limited solely to the specific examples described above. Instead, a wide variety of other types of resource requests may be utilized in embodiments of the invention.

Figure 5:
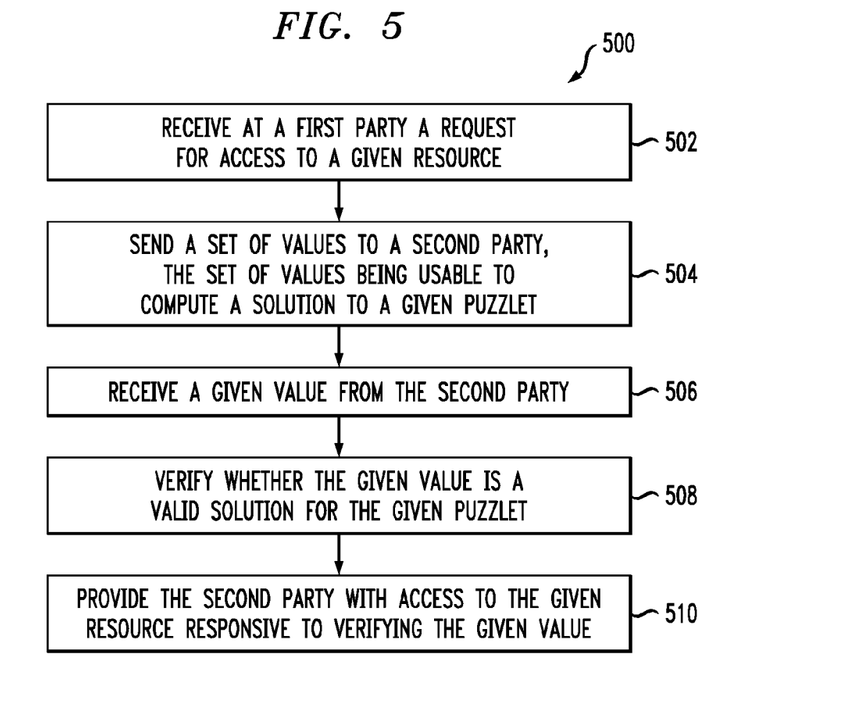
FIG. 5 illustrates a methodology for restricting access to resources by computing solutions to a problem involving inversion of a one-way function, according to an embodiment of the invention.

FIG. 5 illustrates a methodology 500 for restricting access to resources by computing solutions to problems involving inversion of a one-way function. The methodology 500 may be utilized for resource requests as described above and in the communications shown in FIG. 4. Methodology 500 begins with step 502, receiving at a first party a request for access to a given resource. The outsourcing device 102 and mining entity 302-1 are examples of the first party. In step 504, a set of values is sent to a second party, the set of values being usable to compute a solution to a given puzzlet. The worker devices 104 and resource requestors 304 are examples of the second party.

The methodology 500 continues with step 506, receiving a given value from the second party. In step 508, the first party verifies whether the given value is a valid solution for the given puzzlet. Responsive to verifying the given value, the first party provides 510 the second party with access to the given resource.

As will be appreciated, in the modified Bitcoin system described above, a worker can determine whether a solved puzzlet I represents a global puzzle solution by checking whether I satisfies equation 5. While this may not be problematic in general, an unscrupulous worker might, for instance, withhold a solution to such a puzzlet and demand special compensation for it. Thus, in some embodiments the value of a puzzlet may be concealed by modifying equation 1 as shown below:

$$H(X,n;s) = H_{out}(X, H_{in}(X,n;s,r_{in}), r_{out}) \quad (7)$$

where $r_{in} = H_0(r)$ and $r_{out} = H_1(r)$ for distinct hash functions $H_0$ and $H_1$ and a secret value r. Thus, a puzzlet takes the form $$P = (X, Z_{in}, s, r_{in}). \quad (8)$$

The dependence between $r_{in}$ and $r_{out}$ is important. If $r_{in}$ were selectable by the outsourcer independently of $r_{out}$, the outsourcer could, for a single puzzlet solution I, solve for a valid $r_{out}$ under equation 5 and, with $1/Z_{out}$ work on expectation, easily find a global puzzle solution. For application to spam deterrence, a receiver may send an automated reply to new senders that contains a puzzlet P in the form of equation 8.

In some embodiments, it may be desirable for a worker to be able to determine a puzzlet on its own. For example, a sender of e-mail may not wish to interact with the receiver to select a puzzlet. In such cases, the outsourcer may publish a public key PK (which has a corresponding private key SK that is not published) such that $r_{in}$ may be computed from PK and X by a worker by means of a deterministic function $f$ and $r_{out}$ may be computed from SK and X by the outsourcer by means of a deterministic function g. The correctness of $r_{out}$ may be publicly checkable.

As an example, (SK, PK)=(y, G$^y$) for G, a generator of a suitable group $\mathbb{G}$ of order q in which computational Diffie-Hellman is hard and y is a randomly selected secret key such that $y \in_R \mathbb{Z}_q$. Then, $f(PK,X) = H_f(PK,X)$ for a hash function H' and $g(SK,X) = H_g(X)^y$ for a suitable one-way function $H_g: \{0,1\}^* \to \mathbb{G}$.

The correctness of $r_{out}$ may be proven using a NIZK proof. In this case, g together with the proof constitute a Chaum-Pedersen signature. Alternatively, if $\mathbb{G}$ is an admissible group for a bilinear map $\hat{e}: \mathbb{G} \times \mathbb{G} \to \mathbb{G}'$, then it is possible to verify the correctness of $r_{out}$ by checking the equality $$\hat{e}(H_g(X), PK) \stackrel{?}{=} \hat{e}(r_{out}, G). \quad (9)$$

Given the specification of X in a puzzlet P, a worker can determine, once a block is mined, the public key PK of the outsourcer and can thereby identify transactions performed by the outsourcer. In some embodiments, X can be concealed from workers by associating each puzzlet with an additional secret value t, and let the puzzlet take the form $$P = (H'(X,t), Z_{in}; s) \quad (10)$$

for a hash function H'. The value t would then be revealed only with a solution to the global puzzle or problem. Thus, only a successful worker would be able to identify transactions performed by the outsourcer.

In some embodiments, puzzlets in a modified Bitcoin scheme may be constructed in other fashions. For example, a scheme may be utilized which equalizes the hardness of puzzlet computation across platforms by creating a dependence on main memory latencies, which tend to be relatively uniform among disparately resourced machines. Thus, fairness may be established for workers using various processing devices with different resources.

In some embodiments, the puzzlets may be designed to prevent malicious outsourcing such as password cracking. In the modified Bitcoin system described above, such outsourcing would not be feasible given the structure of the puzzlets and the fact that X is controlled by a community of users. However, in other application areas, it may be desirable to construct the puzzle and puzzlets to avoid the possibility of malicious outsourcing. As one example, a system-specific nonce may be embedded into the puzzle or puzzlets.

The particular processing operations and other system functionality described in conjunction with the FIGS. 1-5 are presented by way of illustrative example only, and should not be construed as limiting the scope of the invention in any way. For example, the ordering of the process steps may be varied in other embodiments, or certain steps may be performed concurrently with one another rather than serially.

The foregoing examples are intended to illustrate aspects of certain embodiments of the present invention and should not be viewed as limiting in any way. Other embodiments can be configured that utilize different techniques, as well as combinations of the above-described techniques. For example, particular features described above with respect to a given embodiment are not restricted solely for use in the given embodiment unless otherwise noted. Instead, embodiments of the invention may combine features described above in conjunction with different embodiments.

It is to be appreciated that the processing functionality such as that described in conjunction with the FIGS. 1-5 and the associated examples above can be implemented at least in part in the form of one or more software programs stored in memory and executed by a processor of a processing device such as outsourcing device 102. As noted above, a memory or other storage device having such program code embodied therein is an example of what is more generally referred to herein as a processor-readable storage medium.

Articles of manufacture comprising such processor-readable storage media are considered embodiments of the present invention. A given such article of manufacture may comprise, for example, a storage device such as a storage disk, a storage array or an integrated circuit containing memory. The term "article of manufacture" as used herein should be understood to exclude transitory, propagating signals.

It is to be appreciated that the particular configuration, elements and operating parameters of the embodiments described above are not requirements of the invention, and should not be construed as limiting the scope of the invention in any way. For example, outsourcing device 102 may be configured with a puzzlet solver module and act as a worker device for additional outsourcing devices. Those skilled in the art can make these and other modifications in the described embodiments in a straightforward manner.

Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
   receiving, at a first processing device from a second processing device, a request for access to a given resource controlled by the first processing device;
   sending, from the first processing device to the second processing device, a set of values responsive to receiving the request for access to the given resource, the set of values being usable to compute a solution to a first problem involving inversion of a first one-way function;
   receiving, at the first processing device from the second processing device, a given value representing a potential solution to the first problem;
   providing, at the first processing device, access to the given resource by the second processing device responsive to verifying the given value as a valid solution to the first problem; and
   utilizing, at the first processing device, the given value as an input for computing a solution to a second problem involving inversion of a second one-way function;
   wherein a valid solution to the second problem uses as input the valid solution to the first problem; and
   wherein the set of values comprises a supplementary value specific to a particular instance of the first one-way problem and the second processing device, the supplementary value being used as an input to the first one-way function by the second processing device.

2. The method of claim 1, wherein the first problem has $k_{in}$-bit hardness and the second problem has $k_{out}$-bit hardness such that $k=k_{in}+k_{out}$, where $k_{in} \leq k/2$.

3. The method of claim 1, wherein the given resource comprises one of a transmission control protocol connection to a server and a transport layer security connection to the server.

4. The method of claim 1, wherein the given resource comprises accepting an e-mail sent to the first processing device from the second processing device.

5. The method of claim 1, wherein the given resource comprises a website of the first processing device.

6. The method of claim 1, wherein the valid solution to the second problem is usable in a system for mining digital currency involving finding a solution to a third problem involving inversion of a third one-way function.

7. The method of claim 6, wherein the third problem comprises finding a value n such that:

$$H(X,n;s) \leq Z$$

where H is the third one-way function, X comprises a set of known information, s is the supplementary value, and Z is a target value representing a difficulty of mining the digital currency.

8. The method of claim 7, further comprising providing a payment to the second processing device based at least in part on a comparison of a value of a solution to H divided by Z.

9. The method of claim 7, wherein the first one-way function, the second one-way function and the third one-way function are related such that:

$$H(X,n;s) = H_{out}(X, H_{in}(X,n;s))$$

where $H_{in}$ is the first one-way function and $H_{out}$ is the second one-way function.

10. The method of claim 9, wherein the supplementary value s is chosen by the first processing device based at least in part on the request for access to the given resource.

11. The method of claim 10, wherein:
   the request for access to the given resource comprises sending an e-mail message to the first processing device; and
   s is a hash of at least one of a preamble of the e-mail message and a body of the e-mail message.

12. The method of claim 9, wherein the set of values sent to the second processing device comprises X, $Z_{in}$ and s and a valid solution I to the first problem is given by: $I = H_{in}(X, n;s) \leq Z_{in}$ where $Z_{in}$ is a target value representing a difficulty of solving the first problem.

13. The method of claim 7, wherein the first one-way function, the second one-way function and the third one-way function are related such that:

$$H(X,n;s) = H_{out}(X, H_{in}(X,n;s,r_{in}), r_{out})$$

where $H_{in}$ is the first one-way function, $H_{out}$ is the second one-way function, $r_{in} = H_0(r)$, $r_{out} = H_1(r)$, $H_0$ and $H_1$ are distinct hash functions, and r is a secret value.

14. The method of claim 13, wherein the set of values sent to the second processing device comprises X, $Z_{in}$, s and $r_{in}$ and a valid solution I to the first problem is given by:

$$I = H_{in}(X,n;s,r_{in}) \leq Z_{in}$$

where $Z_{in}$ is a target value representing the difficulty of solving the first problem.

15. An article of manufacture comprising a processor-readable storage medium having processor-readable program code embodied therein, which, when executed by a processor of a first processing device, causes the processor:
   to receive, from a second processing device, a request for access to a given resource controlled by the first processing device;

to send, to the second processing device, a set of values responsive to receiving the request for access to the given resource, the set of values being usable to compute a solution to a first problem involving inversion of a first one-way function;

to receive, from the second processing device, a given value representing a potential solution to the first problem;

to provide access to the given resource by the second processing device responsive to verifying the given value as a valid solution to the first problem; and to utilize the given value as an input for computing a solution to a second problem involving inversion of a second one-way function;

wherein a valid solution to the second problem uses as input the valid solution to the first problem; and wherein the set of values comprises a supplementary value specific to a particular instance of the first one-way problem and the second processing device, the supplementary value being used as an input to the first one-way function by the second processing device.

16. The article of manufacture of claim 15, wherein the valid solution to the second problem is usable in a system for mining digital currency involving finding a solution to a third problem involving inversion of a third one-way function.

17. The article of manufacture of claim 15, wherein the given resource comprises accepting an e-mail sent to the first processing device from the second processing device.

18. An apparatus comprising:
a first processing device comprising:
   a memory; and
   a processor coupled to the memory;
the first processing device being configured to implement a puzzlet generation module configured:
   to receive, from a second processing device, a request for access to a given resource controlled by the first processing device; and
   to send a set of values to the second processing device responsive to receiving the request for access to the given resource, the set of values being usable to compute a solution to a first problem involving inversion of a first one-way function;
the first processing device being further configured to implement a puzzlet verification module configured:
   to receive a given value from the second processing device representing a potential solution to the first problem;
   to provide access to the given resource by the second processing device responsive to verifying the given value as a valid solution to the first problem; and
   to utilize the given value as an input for computing a solution to a second problem involving inversion of a second one-way function;
wherein a valid solution to the second problem uses as input a valid solution to the first problem; and
wherein the set of values comprises a supplementary value specific to a particular instance of the first one-way problem and the second processing device, the supplementary value being used as an input to the first one-way function by the second processing device.

19. The apparatus of claim 18, wherein the valid solution to the second problem is usable in a system for mining digital currency involving finding a solution to a third problem involving inversion of a third one-way function.

20. The apparatus of claim 19, wherein the first processing device is part of a pool of processing devices used by a first party for mining the digital currency.

* * * * *